United States Patent Office 3,583,886
Patented June 8, 1971

---

3,583,886
PROCESS FOR FORMING CATALYTIC ELECTRODES
Albert E. Baker, Jr., Ipswich, Mass., assignor to General Electric Company
No Drawing. Filed Nov. 17, 1964, Ser. No. 411,693
Int. Cl. H01m *13/08*
U.S. Cl. 136—120FC          4 Claims

---

ABSTRACT OF THE DISCLOSURE

The invention is directed to a process of forming a catalytic electrode. To accomplish this a molding composition is formed of a catalytic powder having an average particle size less than 250 angstroms and from 0.5 to 50 percent by weight of a thermoplastic binder having an average maximum particle dimension of less than 50 microns and a critical surface tension less than the surface tension of water. The molding composition is shaped at elevated temperatures and pressures to form a billet. The billet is sliced into thin sheets of uniform thickness and united to one or more current collectors.

---

The invention is directed to an improved process of constructing catalytically active electrodes for fuel cell batteries.

Fuel cells are typically constructed of an anode and a cathode separated by an electrolyte. Fuel and oxidant are separately supplied to the anode and the cathode respectively. Each of the electrodes must be catalytically active in order to effectively convert the fuel and oxidant to the ionic form for the transport of labile electrons through an external circuit and the transport of either fuel or oxidant generated ions through the electrolyte.

Catalytic electrodes have heretofore been constructed by molding a catalyst powder or paste to a screen or mesh current collector. This process requires the uniform spreading of the catalytic powder or paste on a molding surface by hand using a knife edge. Further, the molding surface must be precoated with a release agent to prevent sticking of the catalytic powder or paste. A second mold surface having the current collector attached thereto is pressed against the first mold surface whereby the catalytic material is forced into the voids of the current collector and effectively united thereto. Upon removal from the mold, the electrode is subjected to chemical treatment to remove the undesirable impurities introduced by the mold release agent.

The conventional catalyst electrode forming process is subject to a number of limitations. Obtaining a uniform layer of catalyst paste by hand spreading is a tedious operation. The problems of hand spreading are accentuated by the fact that noble metals are generally employed as catalyst materials and slight variations in the thickness of the catalyst paste layer can significantly affect the cost of constructing a fuel cell battery. Further, results obtained by hand spreading may vary from operator to operator despite control efforts. Finally, the employment of mold release agents as well as materials to chemically strip these agents from the completed electrodes necessarily increases the time and cost involved in catalytic electrode manufacture and increases the possibility of catalyst contamination.

It is an object of the present invention to provide a process for efficiently and uniformly fabricating catalytic materials into structural forms.

It is a further object to fabricate catalytic materials by a process in which neither mold release agents nor chemical stripping agents need be employed.

It is a still further object of the invention to provide a process of manufacturing economically attractive, reliable catalytic electrodes using minimal amounts of catalytic materials.

Briefly stated, the invention relates to molding a composition which includes an intimate blend of 0.5 to 50 percent by weight catalytic material in fine particulate form and a thermoplastic having a critical surface tension less than the surface tension of water. Upon molding under heat and pressure, a billet is formed from which uniformly thin sheets of catalytic material may be sliced. Such sheets of catalytic material are united to current collecting elements to form finished catalytic electrodes.

The catalytic starting materials for use in the invention should be in particulate form. The more finely divided the catalytic material, the greater will be ratio of surface area to unit weight and, hence, the greater the catalytic activity. While the finest practically obtainable catalytic materials are preferred, powders having an average particle diameter of 50 to 250 angstroms are generally obtainable and fully suitable for the practice of the process. Any solid material having catalytic properties under the conditions of use may be employed. In fuel cell battery applications, suitable catalyts are noble metals and preferably Group VIII noble metals, alternately termed platinum metals. Platinum black is a specifically preferred catalyst starting material.

A molding composition is formed by blending with the particulate catalytic material a thermoplastic binder. The binder performs the two-fold function of reducing the susceptibility of the catalytic material to wetting and of reducing the pressures required to form billets containing catalytic materials. It will be apparent that noble metals, for example, may be molded without the incorporation of a binder; however, the pressures required to yield cohesive bodies of such materials will be so high as to significantly reduce the ratio of surface area to weight and, hence, reduce the catalytic activity. On the other hand, while binders preserve the ratio of surface area to weight of the catalytic materials, excess amounts of binder will dilute the catalytic activity and reduce the electrical conductivity of the product electrodes. Experience has shown that the molding composition must be 0.5 to 50 percent by weight binder in order to yield desirable properties and that 5 to 25 percent by weight binder is preferred. In order to achieve composition uniformtiy, the binder should normally be employed in particulate form having an average maximum particle dimension no greater than fifty microns. The minimum practically obtainable particle size is preferred.

In order to protect the catalytic electrode product from wetting, the binder must have a critical surface tension less than the surface tension of water. A preferred maximum critical surface tension is 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962. A preferred thermoplastic binder for use in the invention is polytetrafluoroethylene sold under the trademark "Du Pont-7-Teflon" which has an average maximum particle dimension of 35 microns.

As an optional ingredient the molding composition may be diluted with distilled water in an amount sufficient to render the molding composition easily workable. Any other additive inert to the molding composition which renders the molding composition more easily workable and which is completely evaporable at elevated temperatures may be employed.

A billet may be formed from the molding composition using any convenient molding apparatus capable of operating at elevated temperatures and pressures. A continuous billet may be formed using an extrusion nozzle, for example, while batch molding may be accomplished employing mating male and female mold halves. The invention is not limited to nor does it require any particular type of molding apparatus.

The molding pressure, temperature, and residence time are inter-related variables. Increase of either pressure, temperature, or residence time will generally permit a proportionate decrease of the remaining two factors. Accordingly, molding pressure, temperature, and material molding time are widely variable. It has generally been found desirable to operate within a pressure range of 5000 p.s.i. to 1500 p.s.i. A preferred pressure range is 1800 to 3000 p.s.i. Temperature range of 750° F. to 350° F. have been found desirable, while it is preferred to operate between 550° F. to 700° F. Residence time for molding may vary from 30 seconds at high pressure-temperature molding conditions to 10 minutes at low pressure-temperature molding conditions. Molding at excessively high temperatures and pressures will reduce the surface area per unit weight of the catalyst. Further high temperatures may degrade the binder. It will be appreciated, however, that molding for extremely short periods at high temperature-pressure extremes may not adversely affect the properties of the billet formed.

There is no tendency of the billet to stick to the molding surface because of the surface tension properties of the thermoplastic ingredient. The exceptional mold release properties of polytetrafluoroethylene, for example, is attributable to its extremely low critical surface tension of 18 dynes/cm.

Upon removal from the molding surface the billet is sliced by any convenient means. Slices of relatively high thickness are undesirable since they increase the cost of the catalytic electrode and since excessively thick slices are less penetrable by gases than relatively thin slices. The minimum slice thickness is determined by the difficulty in handling only. For example, in the case of a billet formed using platinum as catalytic material, it has been determined that slices down to approximately fifteen platinum atoms thick will be catalytically effective. A desirable balance between handling difficulty and material cost is achieved in slicing at thicknesses between 0.1 to 1.0 mil.

The catalytic material containing sliced sheets may be united to conventional current collectors of conventional design. Generally, metal screen or mesh current collectors are preferred for use in fuel cells. The sheets may be pressed onto the catalytic material or may be adhesively united to the current collectors as, for example, by using polytetrafluoroethylene spray, which is a commonly employed water-proofing agent in electrode formation. The sliced sheets, if desired, may be utilized per se to function as both a catalyst and a current collector.

The invention may be more fully appreciated by consideration of the following examples which are illustrative of the invention and not for purposes of limitation.

EXAMPLE 1

A 9.0 gram quantity of platinum black having an average particle size of 100 angstroms is blended with 1.0 gram of polytetrafluoroethylene, sold under the trademark "Du Pont-7-Teflon," having an average maximum particle dimension of 35 microns. The blended molding composition is placed in a female mold half and a machine fitted plunger thereafter inserted. Molding is conducted under a pressure of 1830 p.s.i. and a temperature of 650° F. for two minutes. The resulting molded billet is removed from the mold and is placed in a microtome. Sheets are sliced which are 0.5 mil in thickness. The sheets are placed on fine mesh nickel screen and are subjected to pressure. The resulting product is a catalytic electrode suitable for use in a fuel cell.

EXAMPLE 2

The process is performed as set out in Example 1, except that a small amount of distilled water is incorporated into the platinum black and polytetrafluoroethylene during blending to increase the ease of working.

What I claim as new and desire to secure by Letters Patent of the United States is:

1. A process of forming a catalytic electrode comprising
   the step of forming a molding composition consisting essentially of
      a noble metal powder having an average particle size less than 250 angstroms, and
      0.5 percent to 50 percent by weight of a thermoplastic binder having an average maximum particle dimension of less than 50 microns and a critical surface tension less than 32 dynes/cm.,
   the step of shaping the molding composition at an elevated temperature in the range of from 350° F. to 750° F. and an elevated pressure in the range of from 1800 to 3000 p.s.i. to form a billet,
   the step of slicing the billet into thin sheets having a thickness of 0.1 to 1.0 mil, and
   the step of uniting the thin sheets to current collector means.

2. A process according to claim 1 in which distilled water is added to the molding composition in an amount sufficient to render the molding composition easily workable, and completely evaporating the distilled water at an elevated temperature.

3. A process according to claim 1 in which the noble metal is platinum black.

4. A process according to claim 1 in which the thermoplastic binder is polytetrafluoroethylene.

References Cited

UNITED STATES PATENTS

| | | | |
|---|---|---|---|
| 3,120,457 | 2/1964 | Duddy | 136—120 |
| 3,181,973 | 5/1965 | Duddy | 136—120 |
| 3,297,484 | 1/1967 | Niedrach | 136—120 |
| 3,284,243 | 11/1966 | Von Sturm | 136—120 |
| 3,375,138 | 3/1968 | Mather, Jr. | 136—86 |
| 3,432,355 | 3/1969 | Niedrach et al. | 136—120 |

WINSTON A. DOUGLAS, Primary Examiner

M. J. ANDREWS, Assistant Examiner